United States Patent [19]

Till

[11] Patent Number: 4,806,052
[45] Date of Patent: Feb. 21, 1989

[54] CARRIAGE FOR MACHINE TOOLS

[75] Inventor: Konrad Till, Neustetten-Remmingsheim, Fed. Rep. of Germany

[73] Assignee: KM Werkzeugmaschinen GmbH, Mössingen, Fed. Rep. of Germany

[21] Appl. No.: 58,354

[22] Filed: Jun. 4, 1987

[30] Foreign Application Priority Data

Jun. 7, 1986 [DE] Fed. Rep. of Germany ....... 3619213

[51] Int. Cl.⁴ .................... B23Q 1/18; F16C 29/00
[52] U.S. Cl. ........................... 409/231; 82/32; 384/29; 384/42; 409/235; 409/286; 409/337
[58] Field of Search .............. 29/DIG. 101; 408/234; 409/235, 286, 287, 337, 231-233; 384/29, 42, 13; 82/32

[56] References Cited

U.S. PATENT DOCUMENTS 3,095,247  6/1963  Von Zelewsky ............ 384/40
4,506,935  3/1985  Suzuki et al. .............. 384/29 X
4,518,205  5/1985  Heathe ..................... 384/29
4,566,738  1/1986  Fasth ...................... 384/42 X Primary Examiner—Gil Weidenfeld
Assistant Examiner—Steven C. Bishop
Attorney, Agent, or Firm—Michael J. Striker

[57] ABSTRACT

A carriage unit for a machine tool, especially forming a tool support for drilling or milling machines, comprises a carriage having a guiding foot which has a cross-section in form of a quarter of a circular cylindrical ring and is provided with a cylindrical outer surface and two ring intersecting surfaces which form sliding surfaces of the guiding foot, and supporting elements including a parallelepiped-shaped guiding block mountable on a machine tool housing and having a quarter cylindrical bearing surface on which the outer cylindrical surface of the guiding foot abuts, and two guiding strips mounted on the guiding block and each having a counter surface for abutting by a respective one of the ring intersecting surfaces of the guiding foot.

4 Claims, 2 Drawing Sheets

4,806,052

CARRIAGE FOR MACHINE TOOLS

BACKGROUND OF THE INVENTION

The present invention relates to a carriage for machine tools, particularly as tool holders for drilling or milling machines.

Conventional carriage guides on machine tools, namely flat guides or prismatic guides, generally possess the disadvantage that they require high production costs. Each part of the guides must be worked individually. It is to be understood that further improvements of the carriages in this sense are desirable.

SUMMARY OF THE INVENTION

Accordingly, it is an object of the present invention to provide a carriage guide which avoids the disadvantages of the prior art.

More particularly, it is an object of the present invention to provide a carriage guide which has substantially the same bearing and guiding quality and the same manufacturing accuracy, and at the same time, can be produced at more favorable prices than conventional carriage guides for machine tools.

In keeping with these objects and with others which will become apparent hereinafter, one feature of the present invention resides, briefly stated, in that a carriage is provided with a guiding foot whose cross-section corresponds to a quarter of a circular cylindrical ring and whose outer circular surface and ring intersecting surfaces form sliding surfaces, wherein the circular outer surface abuts against a correspondingly designed quarter cylinder bearing surface formed in a parallelepiped-shaped guiding block which is mounted on the machine tool housing while the countersurfaces for the ring intersecting surfaces of the guiding foot are formed by guiding strips which are mounted on the guiding block.

In accordance with an advantageous feature of the present invention, the parallelepiped-shaped guiding block is provided with a square base cross-section. The axis of the quarter cylinder bearing surface formed in the guiding block coincides with the failing edge of the guiding block, or in other words, extends through the failing corner point of the worked guiding block, the corner point in the square base cross-section of the guiding block.

In the carriage formed in accordance with the present invention, four parallelepiped-shaped guiding blocks can be partially jointly worked. For this purpose the four guiding blocks are pre-mounted to form a four-piece block. Subsequently the quarter cylinder bearing surfaces are formed simultaneously in the four individual guiding blocks by central boring in the four-piece pre-mounted block. After individual working of the flat abutment surfaces of the individual guiding blocks, the four guiding blocks can be again assembled for simultaneous fine working (boring and honing) of the quarter cylinder bearing surfaces, before they are finally individually nitrogen-hardened.

As a result, large bearing surfaces with respectively favorable bearing pressure distribution are produced. The carriage guide is compact and space-economical, so that several carriage units which operate independently from one another can be relatively tightly arranged near one another on a machine tool body. In any angular arrangement of the guiding block for the carriage foot a high guiding accuracy of the carriage is obtained. The carriage can be formed directly as a headstock housing, such that a drive support can be mounted on its upper side. Thereby, small distances can be maintained between the displacement device and the drive spindle, so that tilting moments which act on the carriage bearing can be maintained small.

In accordance with another advantageous feature of the present invention, the guiding block for the guiding foot of the carriage can be arranged so that the countersurface formed by a first guiding strip for the ring intersecting surface of the guiding foot is vertical, while the counter surface formed on the second guiding strip for the other ring intersecting surface of the guiding foot extends horizontally. The quarter cylinder bearing surface of the guiding block can also be depressed in its central peripheral region at least locally. Thereby a free bearing region is obtained which acts as a lubricant storing area, in which the guiding foot of the carriage does not abut with its circular outer surface against the quarter cylinder bearing surface.

The novel features which are considered as characteristic for the invention are set forth in particular in the appended claims. The invention itself, however, both as to its construction and its method of operation, together with additional objects and advantages thereof, will be best understood the following description of specific embodiments when read in connection with the accompanying drawings.

DESCRIPTION OF A PREFERRED EMBODIMENT

Figure 1:
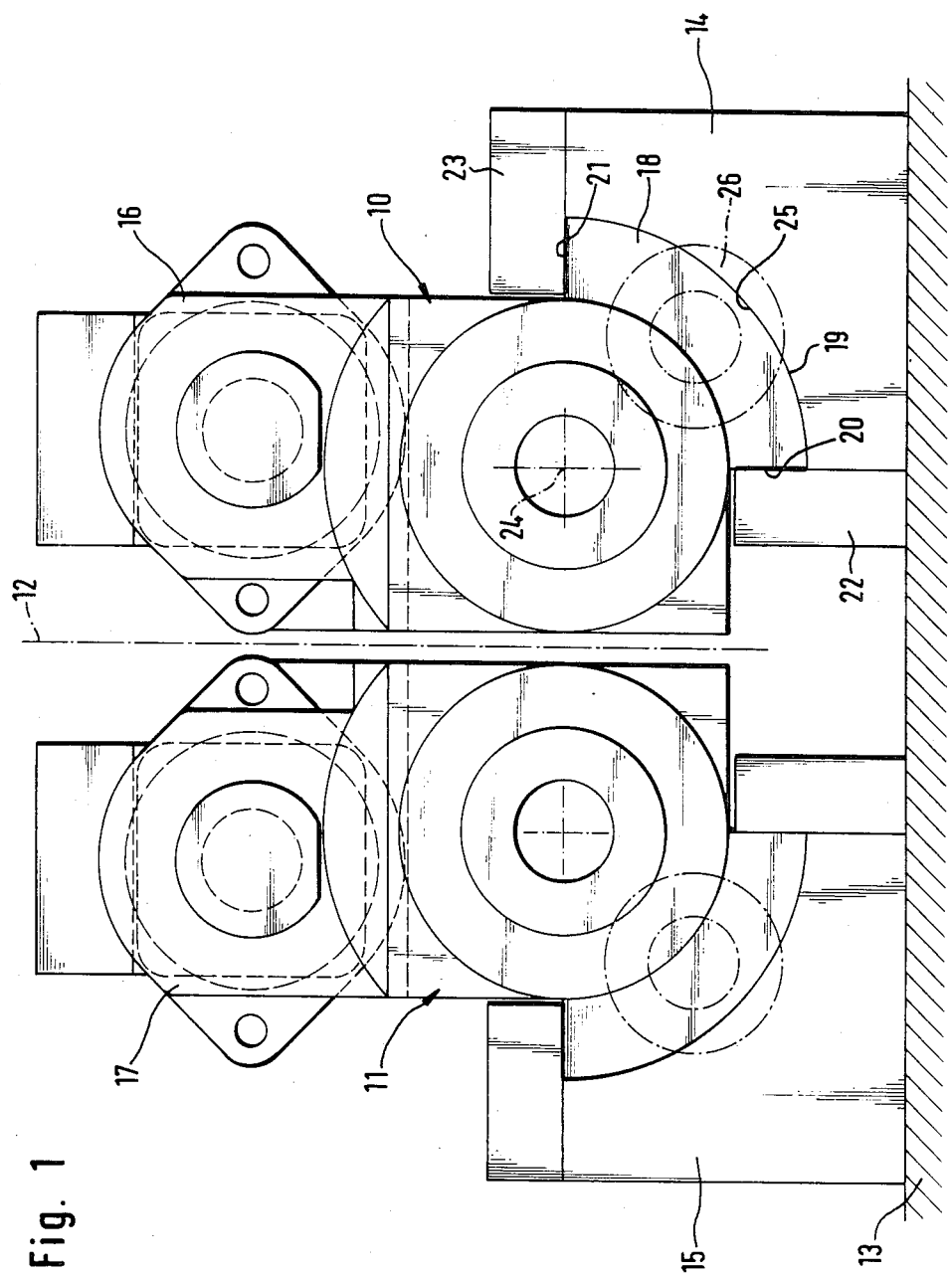
FIG. 1 is a view schematically showing a cross-section of two parallel carriages which are supported on a machine tool housing in an adjustable manner.

FIG. 1 shows two identical carriages 10 and 11 which are formed as headstock housings. They are supported in a mirror-symmetrical manner with respect to a vertical central plane 12, on two identical parallel guiding blocks 14 and 15 which are mounted on a common machine housing 13. The carriages 10 and 11 are longitudinally displaceable on the guiding blocks 14 and 15. Drive supports 16 and 17 which are not illustrated in detail, are arranged on the carriages 10 and 11, respectively. Only one of the carriages, namely the carriage 10 with its guiding block 14, will be described in detail hereinbelow.

The parallelepiped-shaped carriage 10 is provided in its lower corner region with a guiding foot 18. The guiding foot 18 has the shape of a quarter of a circular cylindrical ring. Its circular outer surface 19 and its both ring intersecting surfaces 20 and 21, form sliding surfaces for the guiding foot. The counter surfaces for the guiding foot 18 of the carriage 10 are formed in the parallelepiped-shaped guiding block 14 and two guiding strips 22 and 23 which are mounted on the guiding block 14.

As can be seen from FIG. 1, the parallelepiped-shaped guiding block 14 has a square base cross-section. A quarter cylinder sector of a circular cylinder is removed from the guiding block 14. The axis of this circular cylinder extends through the remote left upper longitudinal edge of the guiding block 14 or the left upper corner 24 of the cross-section shown in FIG. 1. Thereby, a quarter cylindrical bearing surface 25 is formed in the guiding block 14. It coincides with the outer circular surface 19 of the guiding foot 18 of the carriage 10. The counter surfaces which coincide with the ring intersecting surfaces 20 and 21 are formed by the guiding strips 22 and 23 which are mounted on the guiding block 14.

From FIG. 1 which shows the double arrangement of the carriages, it can be recognized that for manufacture of the quarter cylindrical bearing surfaces 25 of the guiding block 14, it is possible to assemble two parallelepiped-shaped guiding blocks 14 and 15 and two other identical guiding blocks so as to form a four-piece block. Such four-piece block can be then bored jointly along the oppositely located four longitudinal edges 24 as mentioned hereinabove.

Figure 2:
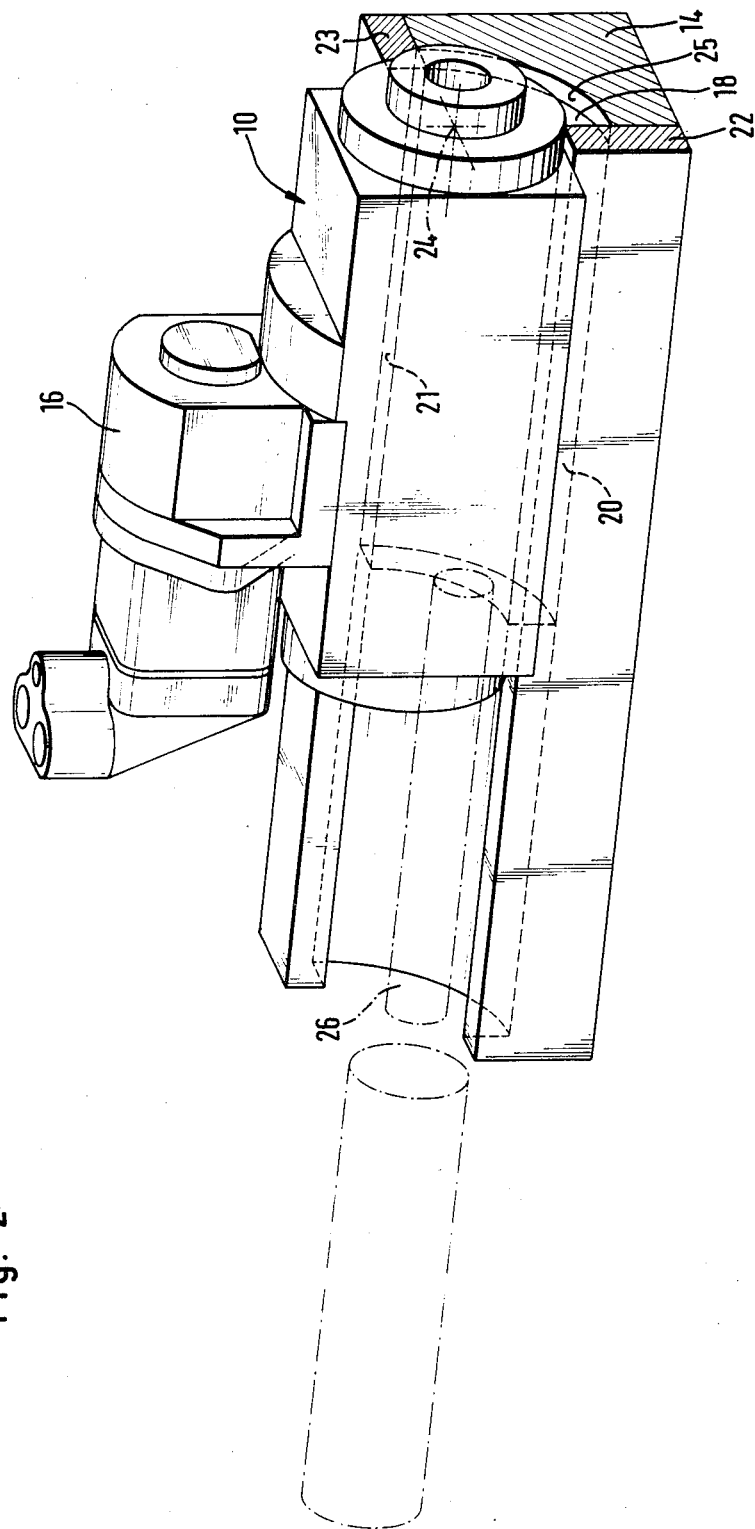
FIG. 2 is a perspective view of a carriage which supports a tool, and its guiding block in accordance with the present invention.

The carriage 10 is formed as a headstock housing in which a central spindle opening is provided. The spindle opening has an axis which extends through the point 24 shown in FIG. 1. A spindle 26 which is schematically shown in FIG. 2, or a cylinder can extend in the above described opening.

The quarter cylindrical bearing surface 25 of the guiding block 14 can be partially depressed or deepened in its central peripheral region. Thereby a free bearing region is formed which acts as a lubricant storage area. In this region the guiding foot 18 of the carriage 10 does not abut against the quarter cylindrical bearing surface 25.

It will be understood that each of the elements described above, or two or more together, may also find a useful application in other types of constructions differing from the types described above.

While the invention has been illustrated and described as embodied in a carriage for a machine tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A carriage unit for a machine tool, especially forming a tool support for drilling or milling machines, comprising a carriage having a guiding foot which has a cross-section in form of a quarter of a circular cylindrical ring and is provided with a cylindrical outer surface and two ring intersecting surfaces which form sliding surfaces of said guiding foot; and supporting means including a parallelepiped-shaped guiding block mountable on a machine tool housing and having a quarter cylindrical bearing surface on which said outer cylindrical surface of said guiding foot abuts, and two guiding strips mounted on said guiding block and each having a counter surface for abutting by a respective one of said ring intersecting surfaces of said guiding foot.

2. A carriage unit as defined in claim 1, wherein said parallelepiped-shaped guiding block has a substantially square base cross-section in which three corners are present and one corner is removed, said quarter cylindrical bearing surface of said guiding block having an axis which coincides with said removed corner of said base cross-section.

3. A carriage unit as defined in claim 1, wherein said guiding block is arranged so that one of said counter surfaces which is formed by one of said guiding strips for one of said ring intersecting surfaces of said guiding foot extends vertically, while the other of said counter surfaces which is formed by the other of said guiding strips for the other of said ring intersecting surfaces of said guiding foot extends horizontally.

4. A carriage unit as defined in claim 1, wherein said carriage is formed as a headstock housing provided with an upper side; and further comprising a drive support mounted on said upper side of said headstock housing.

* * * * *